Dec. 23, 1941.  R. GUYOT  2,267,331
FASTENER
Filed Dec. 4, 1940
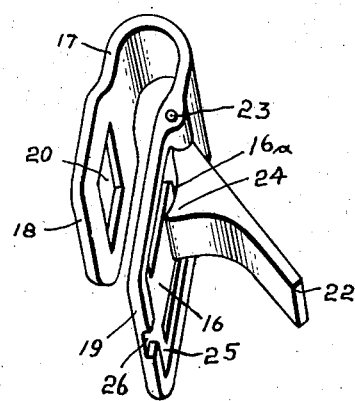
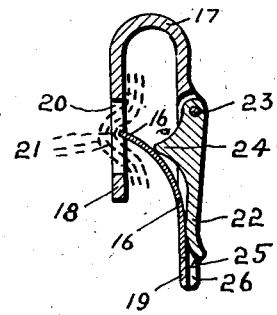
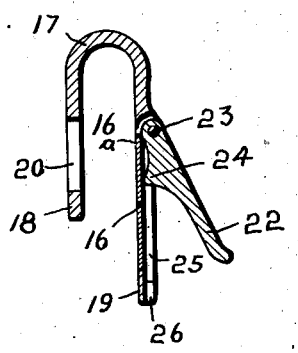
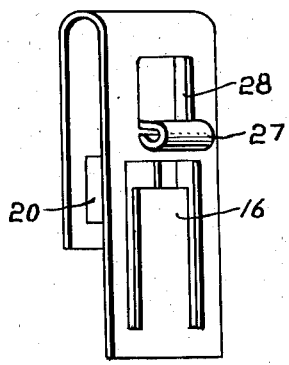
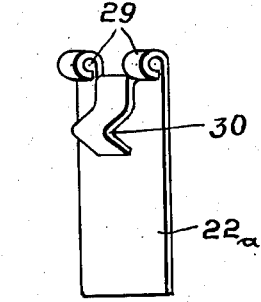
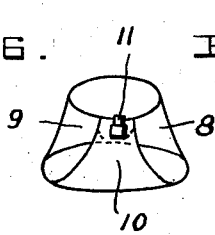
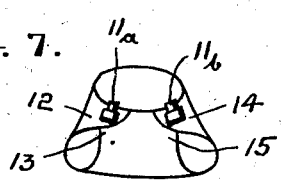
INVENTOR:
REINHARD GUYOT,
By: Otto H. Kugler.
his atty.

Patented Dec. 23, 1941

2,267,331

UNITED STATES PATENT OFFICE 2,267,331

FASTENER

Reinhard Guyot, Los Angeles, Calif.

Application December 4, 1940, Serial No. 368,462

3 Claims. (Cl. 24—258)

This invention relates to devices used for fastening several parts, or ends of materials, such as sheets of cloth; more particularly, for fastening diapers, or infants' breech-cloth.

One of the objects of this invention is to provide a device for fastening a plurality of materials in such a manner as to give the same functional security as a safety pin, having however embodied therein additional features whereby dangers may be eliminated such as involved by the swallowing of safety pins and any other injuries possible with open safety pins.

Another object is to provide a device that can be manipulated with a single fastening operation.

Another object is to provide a device that can be manipulated by a simple pressure without a punching of materials.

Another object is to provide a device that will securely hold against pulling from all directions with equal gripping effect.

Another object is to provide a device which locks itself against self-opening.

Another object is to provide a device that locks in such a manner that it protects against opening by a baby.

Another object is to provide a device so flat and smooth that it cannot harm a baby and does not bulge.

Other objects will appear from the following discription and appended claims as well as from the accompanying drawing, in which—

Fig. 1 is a perspective illustration of a clamping fastener in open position embodying this invention.

Fig. 2 is a longitudinal midsectional view of the fastener in closed position, having several curved dotted lines to indicate possible positions of different materials.

Fig. 3 is a similar midsectional view in open position and without any indicated enclosed materials.

Fig. 4 is a perspective illustration of a slightly modified form, made of sheet material, cut, blanked and formed from one piece, to be the clamping part.

Fig. 5 is a perspective illustration of a slightly modified form, also made of sheet material, for the lever part of the fastener.

Figs. 6 and 7 show the application of this type of fasteners on diapers for babies.

Altho this new fastener has particularly great advantages for use on baby-diapers, it must be understood from the beginning that it is not at all limited to such use, since it may find numerous applications, with children's wear as also for other purposes.

Most diapers of today are fastened together by means of safety pins, which, however, hazard in many ways the wellbeing or even the lives of the babies.

As this device is of greaest advantage in the use with babies' or children apparel, and its functional design derived features particularly adaptable for the use on diapers against pulls in all directions, it may perhaps be excused if the following description is made as based on its application with respect to diapers.

Diapers, of course, are applied in various ways so that the illustrations given here are not exceptional or exclusive of other uses or applications. Fig. 6 merely suggests the use of only one fastener as may be preferred by some people; while Fig. 7 indicates the use of two fasteners as other people may be used to apply diapers.

This is merely to indicate that any number of ends, or materials may be grasped by one fastener within reasonable thicknesses fitting into the bifurcated end of the fastener; in Fig. 6, the ends 8, 9, and 10 being secured by the one fastener 11; while in Fig. 7, the ends 12 and 13 are secured by the fastener 11a, and the ends 14 and 15 are secured by another fastener 11b on the same diaper.

For sanitary, or reasons involving the health of a baby, such fasteners should preferably be made of materials suitable for such purposes, though allite, Bakelit, Lucite, horn, metal, wire, or tenite may eventually be used.

While the larger parts, or portions, may be more rigid, the tongue 16 should be flexible, pliable, or even elastic, or springy, so that this part may eventually be made of a separate piece of spring-metal though the rest of the fastener is made of unelastic material in some cases.

Nevertheless, even the larger parts of this device may be desired of springy material, though elasticity may eventually be obtained sufficiently by shaping the parts so thin as to satisfy requirements in particular cases.

The main bifurcated member 17 may be designed rather strongly though a suitably springy effect may be desired for yielding sufficiently when exceptionally much material is placed between the ends 18 and 19, as will be made more clear later on.

The end 18 is provided with an opening 20, for allowing crowding and bulging of inserted materials as indicated by the dotted lines 21 in Fig. 2.

The end 19 is supplied by a spring-like member 16, that may be provided as an integral part of the end 19 when the member 17 is made of such suitable material, though a specially inserted part may be separately attached as by riveting, welding, or the like process, depending on requirements suited for different materials used for the device.

Regardless of material, the front end 16a of this member, or tongue 16, is arranged in such a manner that it will crowd and bulge inserted material suitably centrally into the opening 20 of the end 18 of the bifurcated member 17 in such a manner as to be suitably engaged by the several surrounding edges within the opening, making such edges the real engaging edges for any inserted material. It should be understood that the material of this clip is for many purposes so thin that such edges are suitably sharp as not to require any special shaping of the edges.

This is one of the principal features of this invention, whereby the several inserted materials may be held securely in any direction against comparatively severe pull.

Opening 20 and tongue 16 are proportioned and arranged in such a manner as to leave as even a spacing as possible around all edges between the opening 20 and the tongue 16 so that any inserted material will be wedged against such edges equally securely for any pull in any direction.

This, furthermore, bulges the different pieces of several materials that may have been inserted almost equally much so that the different pieces may be held equally securely no matter whether placed in the bottom, top, or towards the middle of the bulged-in materials.

While, with fasteners that depend on the roughening on one or the other of the members of fasteners, an inserted material may be more or less securely held, depending on whether a particular piece of several may be directly in contact with such roughening; with this new fastener, all the different pieces of inserted materials are by the bulging into the opening 20 as much as possible wedged with equal wedging effect, without any roughening required.

This has the further advantage that the clothing is not unduly torn by any roughening.

In any case where a fastener with roughening is weakening, clothing may even slip, to be thereby torn only so much more, due to slipping over the roughening.

There is nothing in the present device by which any inserted clothing could possibly be so unduly torn or frictionally unduly worn off.

Making then the fastener of spring-like material, more or less clothing or the like may be inserted between the bifurcated ends, to assure a secure holding within the opening by the tongue for a great variety of inserted pieces of materials.

For operating the tongue 16, a lever 22 is hingedly, or swingably, attached to the member 17, the lever 22 being provided with a wedge-face 24 at such a relation to the hinge-connection 23 that the lever will be automatically held in locked position, as best seen in the illustration of Fig. 2.

In the forms of Figs. 1, 2, and 3, the end 19 is recessed at 25 so that the lever 22 may be held therein in such a manner as to offer suitable resistance against being opened by a baby, at the same time forming a smooth outside so as to assure the least possibility of any harm coming to a baby with such a smooth-surfaced and flat fastener.

The comparatively small cut-out 26 facilitates the opening of the fastener by proper persons, since the lever may thereby be reached for proper operations.

In cases where the stamping from sheet metals is desired, such forms as illustrated in Figs. 4 and 5 may prove satisfactory, the hinge-portion 27 being stamped out at 28 from the larger bifurcated part of the fastener; while hinge-portions 29 and the wedge 30 are easily provided as integral parts from the end of the lever 22a.

From this, it will be understood that details of this fastener may be varied to suit different conditions and requirements, without departing from the principles of this invention.

Having thus described my invention, I claim:

1. A fastener having bifurcated ends between which material may be inserted for fastening, one of said ends having engaging edges formed around an aperture, the other end having a spring-like tongue terminating and being provided with edges and portions arranged so as to become equally spaced in all directions laterally with respect to said first-named engaging edges in locking condition of the fastener, and a wedge on the last-named end in co-operative relation to the tongue including means by which the wedge will hold the tongue in locking position.

2. A fastener having bifurcated ends between which material may be inserted for fastening, one of said ends having engaging edges formed around an aperture, and a wedge member movably mounted on the other end in such a manner and having lateral edges arranged so as to become spaced equally with respect to the edges of the aperture of the first-named end, said second-named end being provided with a recessed surface whereby said wedge member becomes seated within said end so as to form a uniform flush surface when the wedge member is in locked position.

3. A fastener having bifurcated ends between which material may be inserted for fastening, one of said ends having engaging edges formed around an aperture, and a wedge member movably mounted on the other end in such a manner and having lateral edges arranged so as to become spaced equally with respect to the edges of the aperture of the first-named end, said second-named end being provided with a recessed surface to seat the wedge member with a flush appearance in locked position, there being means whereby the locked wedge member may be reached when in such flush position.

REINHARD GUYOT.